United States Patent [19]
Irifune et al.

[11] Patent Number: 5,436,281
[45] Date of Patent: Jul. 25, 1995

[54] RADIATION-CURABLE ORGANOPOLYSILOXANE

[75] Inventors: Shinji Irifune; Toshio Ohba, both of Gunma, Japan

[73] Assignee: Shin-Etsu Chemical Co., Ltd., Tokyo, Japan

[21] Appl. No.: 242,394

[22] Filed: May 13, 1994

[30] Foreign Application Priority Data

May 14, 1993 [JP] Japan .................................. 5-113455

[51] Int. Cl.$^6$ ................................................ C08F 2/48
[52] U.S. Cl. ......................................... 522/99; 522/33; 522/40; 522/43; 522/46; 528/32; 528/41
[58] Field of Search ...................... 528/41, 32; 522/99, 522/33, 40, 43, 46

[56] References Cited

U.S. PATENT DOCUMENTS 5,049,617 9/1991 Yoshioka et al. ........................ 528/32
5,182,315 1/1993 Chu et al. ................................ 522/99

FOREIGN PATENT DOCUMENTS 6705    1/1980  European Pat. Off. .
464706  1/1992  European Pat. Off. .
3841843 2/1990  Germany .

*Primary Examiner*—Melvyn I. Marquis
*Attorney, Agent, or Firm*—Millen, White, Zelano & Branigan

[57] ABSTRACT

Proposed is an improved radiation-curable organopolysiloxane composition capable of giving a cured surface film on a substrate surface which exhibits excellent releasability against sticky substances. The composition is obtained by combining two kinds of (meth)acryloxyalkyl-containing organopolysiloxanes in a specified weight proportion, of which one has a relatively large degree of polymerization but contains only a relatively small amount of the silicon-bonded (meth)acryloxyalkyl groups while the other has a relatively small degree of polymerization but contains a relatively large amount of the silicon-bonded (meth)acryloxyalkyl groups. By virtue of this unique formulation, the surface-release sheet provided with a cured surface film of this organopolysiloxane composition and attached to a sticky surface for temporary protection is safe from generation of a peeling noise which is unavoidable in the prior art when a surface-release sheet is peeled off from the sticky surface at a high peeling velocity, especially, when the peeling resistance is great.

11 Claims, No Drawings

RADIATION-CURABLE ORGANOPOLYSILOXANE

BACKGROUND OF THE INVENTION

The present invention relates to a radiation-curable organopolysiloxane composition or, more particularly, to a radiation-curable organopolysiloxane composition which, when cured by irradiation on a substrate, such as a plastic film, forms a cured surface film having excellent adhesive bonding strength to the substrate surface and is capable of exhibiting excellent releasability from sticky substances.

Various types of radiation-curable organopolysiloxane compositions are known in the prior art. Those of a typical class comprise an organopolysiloxane having (meth)acryloxy, i.e. acryloxy and/or methacryloxy, groups in the molecule, and examples are found, for example, in Japanese Patent Kokai 48-48000, 63-135426, 2-45532 and 2-163166 and elsewhere. One of the important applications of these radiation-curable organopolysiloxane compositions is as a surface-treatment coating agent on various kinds of substrate surfaces such as the back surface of pressure-sensitive adhesive tapes, temporary protecting sheets for pressure-sensitive adhesive labels and the like by virtue of the excellent releasability from sticky substances exhibited by the cured film of the composition.

It is a trend in recent years that the bonding work for attaching these pressure-sensitive adhesive tapes or labels to the surface of a substrate is conducted at a high speed by using a machine with rapid rewinding of the adhesive tape from a roll or by peeling the temporary protecting releasable sheet off from the adhesive surface of the labels. A problem in such a bonding work is that, when the sticky adhesive surface coated with a pressure-sensitive adhesive and the releasable surface having a cured film of the organopolysiloxane composition are separated at a high speed, a noise, called a peeling noise, is unavoidably generated, which is sometimes so high as to cause deterioration of the working environments.

Generation of the above mentioned peeling noise means, in an aspect, that the resistance against peeling to separate the adhesive surface and the releasable surface is under uncontrollable fluctuation in a range so large that the machine-bonding works of the pressure-sensitive adhesive tapes or labels, which must desirably be conducted under a constant peeling resistance, is greatly affected thereby to cause inaccuracy in the attaching position of the tapes or labels. It is empirically known that the peeling noise is generated when the peeling resistance exceeds a certain level so that it is eagerly desired to develop an organopolysiloxane-based releasing agent which is free from generation of any peeling noise irrespective of the peeling resistance.

SUMMARY OF THE INVENTION

The present invention accordingly has an object to provide a novel and improved radiation-curable organopolysiloxane composition which can be readily cured by irradiation to give a cured surface film on a substrate exhibiting excellent releasability against sticky substances and free from generation of any peeling noise, even when the peeling resistance is high, in a high-speed separation of a surface-releasing sheet having a cured film thereof from a sticky surface.

Thus, the radiation-curable organopolysiloxane composition of the present invention comprises, as a uniform blend:

(a) a first organopolysiloxane represented by the general formula

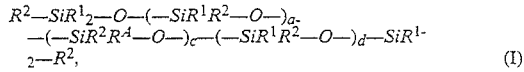
$$R^2-SiR^1_2-O-(-SiR^1R^2-O-)_a-(-SiR^2R^A-O-)_c-(-SiR^1R^2-O-)_d-SiR^1_2-R^2, \quad (I)$$

in which $R^1$ is a hydrogen atom or a monovalent hydrocarbon group selected from the class consisting of alkyl groups having 1 to 4 carbon atoms and a phenyl group, $R^2$ is the same as $R^1$ or an $\omega$-(meth)acryloxyalkyl group represented by the general formula

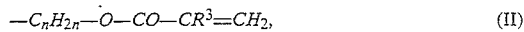
$$-C_nH_{2n}-O-CO-CR^3=CH_2, \quad (II)$$

$R^3$ being a hydrogen atom or a methyl group and n being 1, 2 or 3, $R^A$ is an organosiloxy group represented by the general formula

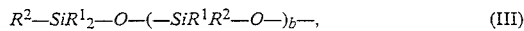
$$R^2-SiR^1_2-O-(-SiR^1R^2-O-)_b-, \quad (III)$$

the groups denoted by $R^2$ including the $\omega$-(meth)acryloxyalkyl groups represented by the general formula (II) given above in a number in the range from 0.5 to 3.0% based on the total number of the groups denoted by $R^1$ and $R^2$, and the subscripts a, b, c and d are each zero or a positive integer with the proviso that $a+bc+d$ is in the range from 500 to 1000 and c does not exceed 3; and (b) a second organopolysiloxane represented by the general formula

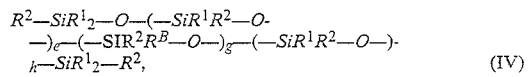
$$R^2-SiR^1_2-O-(-SiR^1R^2-O-)_e-(-SiR^2R^B-O-)_g-(-SiR^1R^2-O-)_h-SiR^1_2-R^2, \quad (IV)$$

in which $R^1$ and $R^2$ each have the same meaning as defined above, $R^B$ is an organosiloxy group represented by the general formula

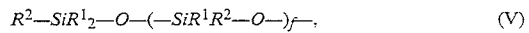
$$R^2-SiR^1_2-O-(-SiR^1R^2-O-)_f-, \quad (V)$$

the groups denoted by $R^2$ including the $\omega$-(meth)acryloxyalkyl groups represented by the general formula (II) given above in a number in the range from 5 to 20% based on the total number of the groups denoted by $R^1$ and $R^2$, and the subscripts e, f, g and h are each zero or a positive integer with the proviso that $e+fg+h$ is in the range from 50 to 200 and g does not exceed 3, in such a proportion that the weight ratio of the first to the second organopolysiloxanes is in the range from 10:90 to 40:60.

DETAILED DESCRIPTION OF THE PREFERRED EMBODIMENTS

As is described above, the essential ingredients in the inventive radiation-curable organopolysiloxane composition include two kinds of $\omega$-(meth)acryloxyalkyl-containing organopolysiloxanes in a specified weight proportion which are similar to each other but distinguishable from each other in respects of the degree of polymerization, i.e. the average number of silicon atoms in a molecule, and the content of the $\omega$-(meth)acryloxyalkyl groups. Namely, the average degree of polymerization is larger in the first organopolysiloxane than in the second organopolysiloxane while the content of the $\omega$-(meth)acryloxyalkyl groups is smaller in the first organopolysiloxane than in the second organopolysiloxane. The organopolysiloxane composition comprising these two kinds of the organopolysiloxanes in a specified weight proportion can be readily cured by irradiation such as by electron beams and, when in the presence of a photochemical reaction initiator, ultraviolet light to exhibit good adhesion to the substrate surface on which it is cured. Further, the surface-release sheet coated with a cured film of the inventive radiation-curable organopolysiloxane composition, which exhibits excellent releasability from any sticky substances, can be separated from a sticky surface by peeling without generation of a peeling noise even when the peeling velocity is large and the peeling resistance is great.

The first organopolysiloxane, as one of the essential ingredients in the inventive composition, component (a), is represented by the above given general formula (I), in which $R^1$ is a hydrogen atom or a monovalent hydrocarbon group selected from the class consisting of alkyl groups having 1 to 4 carbon atoms, i.e. methyl, ethyl, propyl and butyl groups, and a phenyl group, and $R^2$ is the same group as $R^1$ defined above or an $\omega$-(meth)acryloxyalkyl group of the general formula (II) given above, in which $R^3$ is a hydrogen atom to give an acryloxyalkyl group or a methyl group to give a methacryloxyalkyl group and n is 1, 2 or 3. As is understood from the general formula (I), the molecules of the first organopolysiloxane having a generally linear molecular structure have a limited number of pendant organosiloxy groups denoted by $R^4$ represented by the general formula (III). It is essential that from 0.5 to 3.0% in number of the groups denoted by $R^1$ and $R^2$ in a molecule are the $\omega$-(meth)acryloxyalkyl groups of the general formula (II). When the content of the $\omega$-(meth)acryloxyalkyl groups is too small, the radiation-curability of the composition is greatly decreased while, when the content of the $\omega$-(meth)acryloxyalkyl groups is too large, the defect due to generation of the peeling noise is increased in the high-speed peeling of the release paper sheet from a sticky surface. The subscripts a, b, c and d in the general formula (I) are each zero or a positive integer but the subscript c does not exceed 3 or, preferably, 1 or 2 because, when the value of c is 4 or larger, difficulties are caused in the synthetic preparation of the organopolysiloxane due to the unduly great increase in the viscosity of the reaction mixture. The value of $a+bc+d$, which is close to the degree of polymerization, i.e. number of the silicon atoms in a molecule given by $a+c(b+2)+d+2$, is in the range from 500 to 1000. When this value is too small, the defect due to generation of the peeling noise is increased in the high-speed peeling of the release paper sheet from a sticky surface while, when this value is too large, the organopolysiloxane composition has a unduly high viscosity so that a difficulty is encountered in the coating works of the substrate surface with the organopolysiloxane composition.

The second organopolysiloxane, as the other of the essential ingredients in the inventive radiation-curable organopolysiloxane composition, is represented by the general formula (IV) given above, in which $R^1$ and $R^2$ each have the same meaning as defined above for the general formula (I) representing the first organopolysiloxane. As is understood from the general formula (IV), the molecules of the second organopolysiloxane having a generally linear molecular structure have a limited number of pendant organosiloxy groups denoted by $R^B$ represented by the general formula (V). Different from the first organopolysiloxane of the general formula (I), it is essential that from 5 to 20% in number of the groups denoted by $R^1$ and $R^2$ in a molecule are the $\omega$-(meth)acryloxyalkyl groups of the general formula (II). When the content of the $\omega$-(meth)acryloxyalkyl groups is too small, the radiation-curability of the composition is greatly decreased while, when the content of the $\omega$-(meth)acryloxyalkyl groups is too large, the radiation-cured surface film of the composition exhibits an unduly high peeling resistance against peeling of the release paper sheet coated with the composition off a sticky surface although the radiation-curability can be increased thereby. The subscripts e, f, g and h are each zero or a positive integer but the value of the subscript g does not exceed 3 or, preferably, zero or 1. The value of $e+fg+h$, which is correlated to the degree of polymerization, i.e. number of the silicon atoms in a molecule given by $e+g(f+2)+h+2$, is in the range from 50 to 200. When this value is too small, the radiation-curability of the composition is decreased while, when this value is too large, the organopolysiloxane composition has an unduly high viscosity so that a difficulty is encountered in the coating works of the substrate surface with the organopolysiloxane composition.

The radiation-curable organopolysiloxane composition of the present invention can be obtained by merely blending the above described first and second organopolysiloxanes into a uniform mixture. It is essential that these two organopolysiloxanes are blended together in a mixing proportion of the first to the second in the range from 10:90 to 40:60 or, preferably, from 20:80 to 30:70 by the weight ratio. When the amount of the first organopolysiloxane is too small relative to the second organopolysiloxane, a decrease is caused in the advantage that no peeling noise is generated in the high-speed peeling of a release sheet coated with the composition from a sticky surface even when the peeling resistance is great.

The first and the second organopolysiloxanes described above can be prepared by the so-called siloxane rearrangement equilibration reaction effected by heating a mixture consisting of a low-molecular oligomeric organopolysiloxane represented by the general formula

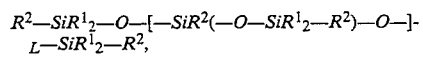
$R^2—SiR^1{}_2—O—[—SiR^2(—O—SiR^1{}_2—R^2)—O—]$-
$L—SiR^1{}_2—R^2$, in which $R^1$ and $R^2$ each have the same meaning as defined above and the subscript L is zero or a positive number not exceeding 3, a first oligomeric cyclic organopolysiloxane represented by the general formula

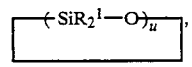

in which $R^1$ has the same meaning as defined above and the subscript u is a positive integer of 3 to 7, and a second oligomeric cyclic organopolysiloxane represented by the general formula

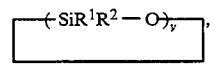

in which $R^1$ and $R^2$ each have the same meaning as defined above, a part or all of the groups denoted by $R^2$ being the $\omega$-(meth)acryloxyalkyl groups, and the subscript v is a positive integer of 3 to 7, in such mixing proportions that the content of the ω-(meth)acryloxyalkyl groups in the resultant organopolysiloxane satisfies the respective requirement for the first or second organopolysiloxane, in the presence of methane sulfonic acid or trifluoromethane sulfonic acid as a catalyst in an amount of 0.1 to 2.0% by weight based on the total amount of these three kinds of oligomeric organopolysiloxanes at a temperature in the range from 80 to 100° C. for a length of time in the range from 4 to 10 hours.

When the inventive radiation-curable organopolysiloxane composition is desired to be cured by irradiation with ultraviolet light, in particular, it is preferable that the composition is admixed with a photochemical reaction initiator such as acetophenone, benzophenone, 4-chlorobenzophenone, 4,4'-dimethoxy benzophenone, 4-methyl acetophenone, benzoin methyl ether, benzoin trialkylsilyl ethers and the like. Other optional additives in the inventive radiation-curable organopolysiloxane composition include retarder agents against curing inhibition by oxygen, reactive diluents, organic solvents, levelling agents, fillers, antistatic agents, antifoam agents, pigments, organopolysiloxanes free from (meth)acryloxy groups and the like each in a limited amount according to need.

The radiation-curable organopolysiloxane composition of the present invention is useful as a back-surface releasing agent of pressure-sensitive adhesive tapes prepared in rolls, in the preparation of a surface release sheet for temporary protection of pressure-sensitive adhesive labels and the like on a plastic film or metal foil as the substrate, as a vehicle in radiation-curable paints and the like. In the above mentioned applications, the inventive organopolysiloxane composition can be applied to the surface of a plastic film or a foil of a metal such as aluminum by using a suitable coating machine such as bar coaters, gravure coaters, reverse coaters and the like in a thickness of 0.01 to 200 μm prior to irradiation with radiation.

The radiation-curable organopolysiloxane composition of the present invention can be cured by irradiation with various kinds of radiations including electron beams, high-energy radiations emitted from a radioisotope, i.e. α-rays, β-rays and γ-rays, and ultraviolet light emitted from mercury arc lamps, medium- and high-pressure mercury lamps and the like. The radiation dose required for complete curing of the inventive radiation-curable organopolysiloxane composition is usually 2 to 5 Mrads when irradiation is performed with electron beams. When the radiation is ultraviolet light, accurate dosimetry is usually difficult but, empirically, it is sufficient, for example, to conduct the irradiation by using a high-pressure mercury lamp of 2 kilowatt output or 80 watts/cm linear output at a distance of 8 cm for a length of time of 0.1 to 10 seconds. The irradiation is conducted usually in an atmosphere of a non-oxidizing gas such as nitrogen.

In the preparation of a surface-release sheet by using the inventive radiation-curable organopolysiloxane composition, a substrate sheet, such as films of polyethylenes, polypropylenes, polyesters and the like, is uniformly coated with the composition in a thickness of 0.01 to 200/μm followed by curing with radiation as mentioned above to give a desired surface release sheet capable of exhibiting excellent releasability against various kinds of adhesive or sticky substances. The surface-release sheet prepared by using the organopolysiloxane composition of the invention is safe from generation of any peeling noises when the surface-release sheet is separated by high-speed peeling from the sticky surface even when the peeling resistance therebetween is great.

In the following, the radiation-curable organopolysiloxane composition of the present invention is illustrated in more detail by way of examples and comparative examples, in which the term of "parts" always refers to "parts by weight". The values of viscosity and refractive index shown below are all obtained by the measurements at 25° C. and the curability of the composition and the properties of the cured film of the composition shown in the examples and comparative examples were determined by the respective testing methods given below.

Curability by Radiation

The radiation-curable organopolysiloxane composition under testing was uniformly applied to the surface of a biaxially oriented polypropylene film in a coating amount of 1 g/m² and the coating layer was irradiated with electron beams in an atmosphere of nitrogen gas to record the minimum dose of the electron beams in Mrads required for complete curing of the coating layer. Complete curing of the coating layer was assumed when rubbing of the surface with a finger tip did not cause falling of the coating layer off the substrate surface or appearance of dullness in the luster.

Peeling Resistance and Peeling Noise

A polypropylene film was coated with the radiation-curable organopolysiloxane composition and the coating layer was cured by the irradiation for complete curing with electron beams in a dose corresponding to the minimum dose determined in the above mentioned curability test of the coating layer. Thereafter, a standard tape of a hot-melt adhesive was applied and bonded to the thus coated surface and subjected to aging by keeping it at 70° C. for 24 hours. After cooling to room temperature, the adhesive tape and the surface-coated polypropylene film were separated at 25° C. by pulling at an angle of 180° on a tensile testing machine at a pulling velocity of 8 meters/minute to record the pulling force in g/5 cm required for peeling of the film.

Generation of the peeling noise was checked organoleptically by several panel members in the above described procedure for the measurement of the peeling resistance conducted in a sound-proof chamber. It was found by repeating the peeling test that generation of the peeling noise had a good correlation with the variation range of the peeling resistance expressed by a symbol δ in the following description, which is given by the equation $$\delta = (p_{max} - p_{min})/p_{av},$$

in which $p_{max}$ is the maximum value, $p_{min}$ is the minimum value and $p_{av}$ is the average value of the peeling resistance.

Adhesiveness Retention

A radiation-cured coating layer of the composition was formed on the surface of a polypropylene film in the same manner as above and a polyester film-based standard pressure-sensitive adhesive tape (Lumirror 31B, a product by Nitto Denko Co.) was applied and bonded to the surface followed by aging at 70° C. for 24 hours under a load of 20 g/cm². After cooling, the adhesive tape was removed from the coated polypropylene film and again bonded to the well polished surface of a stainless steel plate. The pressure-sensitive adhesive tape was peeled off from the stainless steel plate at an angle of 180° in a pulling velocity of 300 mm/minute to record a first peeling resistance in g/2.5 cm.

Separately, the same peeling test from the stainless steel plate as above was conducted by using a fresh adhesive tape to record a second peeling resistance in g/2.5 cm.

The adhesiveness retention was given in % by the ratio of the first peeling resistance to the second peeling resistance each determined in the above described manner. A large value of the adhesiveness retention means little migration of the organopolysiloxane from the radiation-cured coating layer of the organopolysiloxane composition on to the adhesive surface.

Synthetic Example

Into a four-necked flask of i liter capacity equipped with a stirrer, thermometer and Dimroth reflux condenser were introduced 31 g of methyl tris(trimethylsiloxy)silane, 592 g of octamethyl cyclotetrasiloxane and 310 g of 1,3,5,7-tetramethyl-1,3,5,7-tetra-(3-acryloxypropyl) cyclotetrasiloxane together with N,N'-diphenyl-1,4-diaminobenzene in an amount of 20 ppm by weight relative to the total amount of the three kinds of the organopolysiloxanes to form a reaction mixture which was, after agitation for 5 minutes at room temperature, admixed with methane sulfonic acid in an amount of 1.0% by weight based on the total amount of the mixture to effect the acid-catalyzed siloxane rearrangement equilibration reaction by heating at 90 to 100° C. for 8 hours After completion of the reaction, the reaction mixture was admixed with sodium hydrogen carbonate in an amount of three times by weight relative to the methane sulfonic acid and agitated at 110° C. for 2 hours to neutralize the acid catalyst. The reaction mixture was filtered and freed from volatile matters by heating under reduced pressure to give a product in a yield of 90%. The product was a clear, light yellow liquid having a viscosity of 370 centipoise and a refractive index of 1.416 and the content of the 3-acryloxypropyl groups was 8.7% by moles based on the total number of the silicon-bonded organic groups as determined by the infrared absorption spectrophotometry and the $^1$H-NMR spectrometric analysis.

The thus obtained product organopolysiloxane, referred to as the siloxane I hereinafter, could be expressed by an average unit formula of $M_3D_{80}D^A{}_{18}T$, in which M is a trimethylsiloxy unit of the unit formula $(CH_3)_3SiO_{\frac{1}{2}}$, D is a dimethylsiloxane unit of the unit formula $(CH_3)_2SiO$, $D^A$ is a methyl 3-acryloxypropyl siloxane unit of the unit formula $(CH_3)(CH_2=CH-CO-O-C_3H_6)SiO$ and T is a trifunctional methylsiloxane unit of the unit formula $CH_3SiO_{3/2}$.

In substantially the same manner as above excepting for the modification of the mixing proportions of the starting oligomeric organopolysiloxanes, six more organopolysiloxanes, referred to as the siloxanes II, III, IV, V, VI and VII, were prepared, of which Table 1 below shows the degree of polymerization DP, contents of the 3-acryloxypropyl groups in % by moles based on the total amount of the organic groups bonded to the silicon atoms, viscosity and refractive index for each together with the data for the siloxane I. The average unit formulas of these siloxanes I to VII are as follows.

Siloxane I: $M_3D^A{}_{18}D_{80}T$
Siloxane II: $M_3D^A{}_{18}D_{180}T$
Siloxane III: $M_3D^A{}_5D_{491}T$
Siloxane IV: $M_3D^A{}_{25}D_{471}T$
Siloxane V: $M_3D^A{}_{14}D_{682}T$
Siloxane VI: $M_3D^A{}_{10}D_{986}T$
Siloxane VII: $M_3D^A{}_{50}D_{946}T$

TABLE 1

| Siloxane | I | II | III | IV | V | VI | VII |
|---|---|---|---|---|---|---|---|
| DP | 100 | 200 | 500 | 500 | 700 | 1000 | 1000 |
| Acryloxy content, % by moles | 8.7 | 4.4 | 0.5 | 2.5 | 1.0 | 0.5 | 2.5 |
| Viscosity, cp | 370 | 210 | 820 | 2530 | 9280 | 3850 | 93800 |
| Refractive index | 1.416 | 1.427 | 1.405 | 1.409 | 1.406 | 1.405 | 1.409 |

EXAMPLES 1 to 5 and COMPARATIVE EXAMPLES 2 and 2

In each of Examples I to 5 and Comparative Example 2, a radiation-curable organopolysiloxane composition was prepared by blending 70 parts of the siloxane I with 30 parts of the siloxane III, IV, V, VI, VII or II, respectively, and these radiation-curable organopolysiloxane compositions were subjected to the evaluation tests for the curability, peeling resistance, adhesiveness retention and peeling noise by the procedures described above. In Comparative Example 1, the siloxane I alone was subjected to the same tests. The results of the evaluation tests are shown in Table 2 below. The values of the above defined c were smaller than 0.1 in Examples 1 to 4 and Comparative Example 2, 0.15 in Example 5 and 0.48 in Comparative Example 1.

EXAMPLE 6 and COMPARATIVE EXAMPLES 3 and 4

Radiation-curable organopolysiloxane compositions were prepared by blending the siloxane I and the siloxane V in weight proportions of 90:10 in Example 6, 95:5 in Comparative Example 3 and 50:50 in Comparative Example 4. The results of the evaluation tests of these compositions are shown in Table 2.

TABLE 2

| | Curability, Mrad | Peeling resistance, g/5 cm | Adhesiveness retention, % | Peeling noise |
|---|---|---|---|---|
| Example 1 | 5.0 | 37 | 90 | no |
| Example 2 | 4.0 | 40 | 95 | no |
| Example 3 | 3.0 | 48 | 95 | no |
| Example 4 | 4.0 | 38 | 90 | no |
| Example 5 | 3.0 | 52 | 97 | slightly yes |
| Comparative Example 1 | 2.5 | 60 | 100 | yes |
| Comparative Example 2 | 2.5 | 19 | 98 | no |
| Example 6 | 3.0 | 50 | 98 | no |
| Comparative Example 3 | 2.5 | 55 | 98 | yes |
| Comparative Example 4 | >5.0 | 20 | 85 | no |

EXAMPLE 7

A radiation-curable organopolysiloxane composition was prepared by uniformly blending 10 parts of the siloxane I, 30 parts of the siloxane III and 3 parts of a photochemical reaction initiator (phenyl 1-hydroxy-isopropyl ketone, Darocur 1173, a product by Merck Co.) and a polypropylene film of 38/m thickness was coated with the composition by using an offset printing machine in a coating thickness of 1.2/m. The coating layer of the organopolysiloxane composition was exposed to ultraviolet light emitted from a high-pressure mercury lamp of a linear output of 80 watts/cm at a distance of 8 cm above the coated surface in an atmosphere of nitrogen gas for 0.5 second to effect curing of the organopolysiloxane composition. Curing of the coating layer was complete and the peeling resistance was 35 g/5 cm by the same peeling test as above without generation of any peeling noise.

What is claimed is:

1. A radiation-curable organopolysiloxane composition which comprises, as a uniform blend:

(a) a first organopolysiloxane represented by the formula

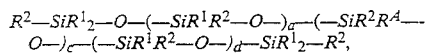

in which $R^1$ is a hydrogen atom or a monovalent hydrocarbon group selected from the class consisting of alkyl groups having 1 to 4 carbon atoms and a phenyl group, $R^2$ is the same as $R^1$ or is an $\omega$-(meth)acryloxyalkyl group represented by the formula $$-C_nH_{2n}-O-XCO-CR^3=CH_2,$$

$R^3$ being a hydrogen atom or a methyl group and n being 1, 2 or 3, $R^A$ is an organosiloxy group represented by the formula

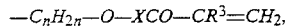

with the proviso that $R^2$ provides the $\omega$-(meth)acryloxyalkyl groups in a number in the range from 0.5 to 3.0% based on the total number of the groups denoted by $R^1$ and $R^2$, and the subscripts a, b, c and d are each zero or a positive integer with the proviso that a+bc+d is in the range from 500 to 1000 and c does not exceed 3; and (b) a second organopolysiloxane represented by the formula

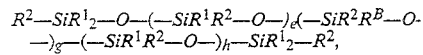

in which $R^1$ and $R^2$ each have the same meaning as defined above, $R^B$ is an organosiloxy group represented by the formula

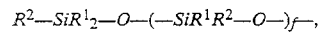

with the proviso that $R^2$ provides the $\omega$-(meth)acryloxyalkyl groups in a number in the range from 5 to 20% based on the total number of the groups denoted by $R^1$ and $R^2$, and the subscripts e, f, g and h are each zero or a positive integer with the proviso that e+fg+h is in the range from 50 to 200 and g does not exceed 3, in such a proportion that the weight ratio of the first to the second organopolysiloxanes is in the range from 10:90 to 40:60.

2. The radiation-curable organopolysiloxane composition as claimed in claim i in which the group denoted by $R^1$ is a methyl group.

3. The radiation-curable organopolysiloxane composition as claimed in claim I in which the subscript n in the formula representing the $\omega$-(meth)acryloxyalkyl group is 3.

4. The radiation-curable organopolysiloxane composition as claimed in claim I in which the subscript c in the formula representing the first organopolysiloxane is 1 or 2.

5. The radiation-curable organopolysiloxane composition as claimed in claim i in which the subscript g in the formula representing the second organopolysiloxane is zero or 1.

6. The radiation-curable organopolysiloxane composition as claimed in claim I in which the weight ratio of the first organopolysiloxane to the second organopolysiloxane is in the range from 20:80 to 30:70.

7. A method for providing a substrate surface with a coating layer releasable from sticky substances which comprises the steps of:

(A) coating the substrate surface with a radiation-curable organopolysiloxane composition comprising, as a uniform blend:

(a) a first organopolysiloxane represented by the formula

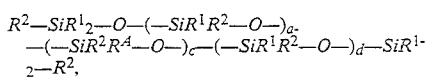

in which $R^1$ is a hydrogen atom or a monovalent hydrocarbon group selected from the class consisting of alkyl groups having 1 to 4 carbon atoms and a phenyl group, $R^2$ is the same as $R^1$ or is an $\omega$-(meth) acryloxyalkyl group represented by the formula $$-C_nH_{2n}-O-CO-CR^3=CH_2,$$

$R^3$ being a hydrogen atom or a methyl group and n being 1, 2 or 3, $R^A$ is an organosiloxy group represented by the formula

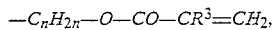

with the proviso that $R^2$ provides the $\omega$-(meth)acryloxyalkyl groups in a number in the range from 0.5 to 3.0% based on the total number of the groups denoted by $R^1$ and $R^2$, and the subscripts a, b, c and d are each zero or a positive integer with the proviso that a+bc+d is in the range from 500 to 1000 and c does not exceed 3; and (b) a second organopolysiloxane represented by the formula

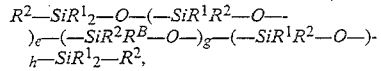

in which $R^1$ and $R^2$ each have the same meaning as defined above, $R^B$ is an organosiloxy group represented by the formula

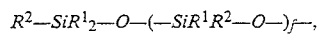

with the proviso that $R^2$ provides the $\omega$-(meth)acryloxyalkyl groups in a number in the range from 5 to 20% based on the total number of the groups denoted by $R^1$ and $R^2$, and the subscripts e, f, g and h are each zero or a positive integer with the proviso that e+fg+h is in the range from 50 to 200 and g does not exceed 3, in such a proportion that the weight ratio of the first to the second organopolysiloxanes is in the range from 10:90 to 40:60, to form a coating layer; and (B) irradiating the coating layer with a radiation in such a dose that the organopolysiloxane composition in the coating layer is cured.

8. The method as claimed in claim 7 in which the radiation is an electron beam.

9. The method of claim 7, wherein the irradiation is by ultraviolet light.

10. The method of claim 9, wherein the radiation-curable organopolysiloxane composition further comprises a photochemical reaction initiator.

11. The method of claim 7, wherein the radiation-curable organopolysiloxane composition is coated on the substrate surface in a thickness of 0.01 to 200 μm.

* * * * *